(12) United States Patent
Schönleitner et al.

(10) Patent No.: US 7,248,486 B2
(45) Date of Patent: Jul. 24, 2007

(54) ENERGY EFFICIENT SWITCHING CONVERTER

(75) Inventors: Arnold Schönleitner, St. Veitgasse (AT); Jalal Abdulazim Hallak, Donaustadtstrasse (AT)

(73) Assignee: Siemens AG Osterreich, Vienna (AT)

(*) Notice: Subject to any disclaimer, the term of this patent is extended or adjusted under 35 U.S.C. 154(b) by 0 days.

(21) Appl. No.: 10/567,242

(22) PCT Filed: Aug. 5, 2004

(86) PCT No.: PCT/AT2004/000277

§ 371 (c)(1),
(2), (4) Date: Jun. 7, 2006

(87) PCT Pub. No.: WO2005/013470

PCT Pub. Date: Feb. 10, 2005

(65) Prior Publication Data

US 2006/0239041 A1 Oct. 26, 2006

(30) Foreign Application Priority Data

Aug. 5, 2003 (AT) ............................ A 1240/2003

(51) Int. Cl.
*H02M 3/335* (2006.01)
*H02H 7/122* (2006.01)

(52) U.S. Cl. .................. 363/21.04; 363/21.09; 363/56.01

(58) Field of Classification Search .......... 363/21.04, 363/21.09, 56.01, 97, 131
See application file for complete search history.

(56) References Cited

U.S. PATENT DOCUMENTS

| 4,156,273 A | 5/1979 | Sato |
| 4,630,186 A | 12/1986 | Kudo |

(Continued)

FOREIGN PATENT DOCUMENTS

DE 34 19 972 10/1985

(Continued)

OTHER PUBLICATIONS

International Search Report of PCT/AT2004/000277 dated Dec. 6, 2004.

*Primary Examiner*—Bao Q. Vu
(74) *Attorney, Agent, or Firm*—RatnerPrestia

(57) ABSTRACT

A switching converter in which an input voltage can be switched by means of at least one controlled switch to at least one primary winding of a transformer, with a control circuit for controlling the switch, to which control circuit a regulating signal in the sense of regulating at least one output voltage is sent, wherein the power supply of the control circuit takes place via the forward voltage of an auxiliary winding of the transformer, a rectifier, a capacitor and a series regulator, on the one hand, and, on the other hand, starting from the input voltage, via a current path and a storage capacitor, and the off-state voltage of an auxiliary winding, which is rectified by means of a rectifier, is additionally sent to the control circuit for power supply, wherein the rectified off-state voltage is used during the operation for supplying the control circuit as long as it has a sufficient voltage level.

9 Claims, 2 Drawing Sheets

U.S. PATENT DOCUMENTS

| | | | |
|---|---|---|---|
| 5,408,401 A * | 4/1995 | Miyazaki | 363/21.08 |
| 5,408,402 A | 4/1995 | Nonnenmacher | |
| 5,768,118 A | 6/1998 | Faulk et al. | |
| 5,953,219 A | 9/1999 | Matsumoto | |
| 6,094,365 A * | 7/2000 | Chiao | 363/56.1 |
| 6,151,225 A * | 11/2000 | Ho et al. | 363/21.09 |
| 6,169,680 B1 * | 1/2001 | Matsui et al. | 363/21.05 |
| 2003/0103360 A1 | 6/2003 | Hatta et al. | |

FOREIGN PATENT DOCUMENTS

| | | |
|---|---|---|
| JP | 09285121 | 10/1997 |
| WO | WO 93/23974 | 11/1993 |

* cited by examiner

ENERGY EFFICIENT SWITCHING CONVERTER

CROSS-REFERENCE TO RELATED APPLICATION

This application is a U.S. National Stage application of PCT Application No. PCT/AT 2004/000277, filed Aug. 5, 2004, which claims priority from Austrian Application No. A 1240/2003, filed on Aug. 5, 2003.

FIELD OF THE INVENTION

The present invention pertains to a switching converter, in which an input voltage can be switched by means of at least one controlled switch to at least one primary winding of a transformer, with a control circuit for controlling the switch, to which a regulating signal is sent in the sense of regulating at least one output voltage, wherein the control circuit is supplied with power via the forward voltage of an auxiliary winding of the transformer, a rectifier, a capacitor and a series regulator, on the one hand, and, on the other hand, starting from the input voltage, via a current path and a storage capacitor.

BACKGROUND OF THE INVENTION

In such switching converters, the control circuit receives a rectified output voltage via a series regulator via the auxiliary winding, which operates in the conduction phase of the converter. To also guarantee the start-up of the control circuit when it is connected to the output voltage, the supply voltage input of the control circuit additionally lies on the input voltage via a current path of a relatively high ohmic resistance.

The basic problem of the present invention arises when a broad range of variation of the input voltage is present, at which the converter is to operate. The input voltage is usually obtained by rectifying a power supply and is also called intermediate circuit voltage. If the alternating voltage is in a range between 85 V and 264 V, a direct input voltage of approx. 115 V to 373 V is obtained. A certain minimum voltage of the auxiliary power supply, for example, 15 V, is required for the control circuit. This voltage must be guaranteed at the lowest power supply. However, it follows from this that a high direct-axis voltage component of about 34 V is present on the series regulator at the highest input voltage occurring, so that a power loss of 0.84 W is generated in case of a control circuit power supply of, for example, 25 mA. Such a power loss is undesirable especially in case of small devices.

An embodiment according to the state of the art is explained in greater detail in FIG. 1. An alternating input voltage $U_E$ lies via a controlled switch S on a primary winding $W_P$ of a transformer UET. The switch S is controlled by a control circuit AST, this control circuit receiving information on the current through the switch S and the primary winding $W_P$ by means of a sensor resistor Rsh.

On the secondary side, the voltage of a secondary winding WS is rectified by means of a rectifier diode D1 and smoothed by a capacitor Ca and is available as an output voltage $U_A$. A voltage sensor SPS sends a regulating signal $S_R$ to the control circuit via an optocoupler in order to bring about voltage regulation in the known manner. However, regulation may also take place from the primary side, and input/output currents can also be included in the regulation. The control circuit receives its operating voltage in two different ways: On the one hand, the direct input voltage $U_E$ is sent via a protective resistor Rs to the control circuit AST, using a storage capacitor Cs is this case. On the other hand, the forward voltage of an auxiliary winding W1 is rectified by means of a diode D2 and a capacitor C and is sent as a voltage Uhz to a series regulator LAE, from where the regulated voltage likewise reaches the power supply input of the control circuit AST via an uncoupling diode D3. The primary mass is designated by $M_P$ and the secondary mass by $M_S$.

If the switching converter according to FIG. 1 is connected to the power supply, it first receives the voltage present on the storage capacitor Cs for start-up and after the run-up of the combinational switching circuit, this will supply itself with the auxiliary supply voltage via the auxiliary winding W1, the diode D2 and the series regulator LAE. As was mentioned above, a high direct-axis voltage component also lies on the series regulator LAE in case of a high input voltage, which leads to undesired losses.

The following documents shall also be cited below in connection with the general state of the art:

WO 93/23974 shows a switching converter, which has an auxiliary supply winding. An auxiliary supply voltage can be obtained via this winding in the flyback converter mode. Moreover, an image of the output voltage can also be obtained from this winding for regulating purposes by the use of two diodes. Moreover, the generally common power supply from the input voltage via a voltage divider is likewise present.

DE 3 419 972 A1 shows a combinational switching circuit, which can optionally be operated at a power supply voltage or a battery voltage. Just as in WO 93/23974 mentioned above, an auxiliary winding is provided here as well, which supplies an off-state voltage for supplying the control unit (after rectification). Furthermore, this combinational switching circuit has two separate primary windings, wherein one primary winding is provided for operation with the rectified alternating power supply and the other primary winding for the operation with a 14-V battery. Finally, yet another auxiliary winding may also be present, whose voltage is used for regulating purposes and is supplied to a control circuit for this purpose.

The document JP 09-285 121 discloses two mutually independent converter systems, which do, however, form a functional unit and are to be synchronized with one another such that a defined sequential sequence is obtained during the voltage run-up. Only one of the two converter systems has an auxiliary winding, whose voltage is used for the power supply of the control circuit after rectification. The other converter system cannot start by itself at all but requires the second, run-up converter system.

The switching converter according to U.S. Pat. No. 4,156,273 has two auxiliary windings. One of these auxiliary windings supplies, after rectification, a supply voltage for the control circuit, and this supply voltage can be switched on or off via a controlled switch. The other auxiliary winding has nothing to do with power supply, but the voltage derived from it shall affect the switching behavior in terms of a desired curve shape.

In U.S. Pat. No. 4,630,186, a bipolar transistor, which exhibits a relatively sluggish behavior, is used as the switching transistor. To make possible the fast switching off of this switching transistor, an auxiliary winding is provided, which generates a countervoltage, which is applied to the control electrode of the switching transistor via another switching transistor at a suitable point in time. Yet another auxiliary winding supplies a voltage, which is to affect the switching behavior. Together with a rectifier diode and a capacitor, this auxiliary is called a voltage correction circuit.

BRIEF SUMMARY OF THE INVENTION

One exemplary embodiment of the present invention provides a combinational switching circuit which is suitable for a broad range of input voltages and yet has low losses during the generation of the auxiliary supply voltage for the control circuit.

This is accomplished with a switching converter of the type mentioned in the introduction, in which the off-state voltage of an auxiliary winding, which is rectified by means of a rectifier, is sent according to the present invention additionally to the control circuit for power supply, wherein the rectified off-state voltage is used during the operation to supply the control circuit as long as it has a sufficient voltage level.

In a switching converter according to the present invention, the control circuit AST is supplied in normal operation utilizing the rectified off-state voltage, so that no current flows through the series regulator. This regulator becomes active only when the voltage drops greatly at the output, e.g., in case of short-circuit or during the run-up phase. It shall be summed up here that a total of three voltage supplies are present according to the present invention for the control circuit, namely, first, a supply voltage that is derived from the high input voltage via a resistor with high ohmic resistance and is used to start the control circuit; second, a supply voltage that is derived from the forward voltage of an auxiliary winding and supplies the control circuit during normal operation, and, third, a supply voltage that is derived from an off-state voltage of an auxiliary winding and is then used when the output is short-circuited or is overloaded.

Provisions are made in an advantageous embodiment of the present invention for another auxiliary winding of the transformer to be provided for generating the off-state voltage, wherein this off-state voltage is used via a rectifier directly to supply the control circuit.

This variant offers the advantage that there is a broad range for dimensioning, because the number of turns of the two auxiliary windings can be selected to be different.

Another expedient variant is characterized in that the forward voltage as well as the off-state voltage are taken from a common auxiliary winding, wherein uncoupling/rectifier diodes rectify the forward voltage and send it to the series regulator, and additional uncoupling/rectifier diodes rectify the off-state voltage and send it to the supply voltage terminal of the control circuit.

This embodiment has the advantage that only a single auxiliary winding, which is present according to the state of the art anyway, is needed, and the present invention can be embodied by means of two additional diodes.

Moreover, it is expedient if the output of the series regulator is connected to the storage capacitor via an uncoupling diode. As a result, it is also possible to use series regulators that do not have an uncoupling diode or equivalent means integrated in them.

BRIEF DESCRIPTION OF THE DRAWINGS

The present invention will be explained in greater detail below on the basis of exemplary embodiments, which are illustrated in the drawings. In the drawings.

DETAILED DESCRIPTION OF THE INVENTION

Figure 1:
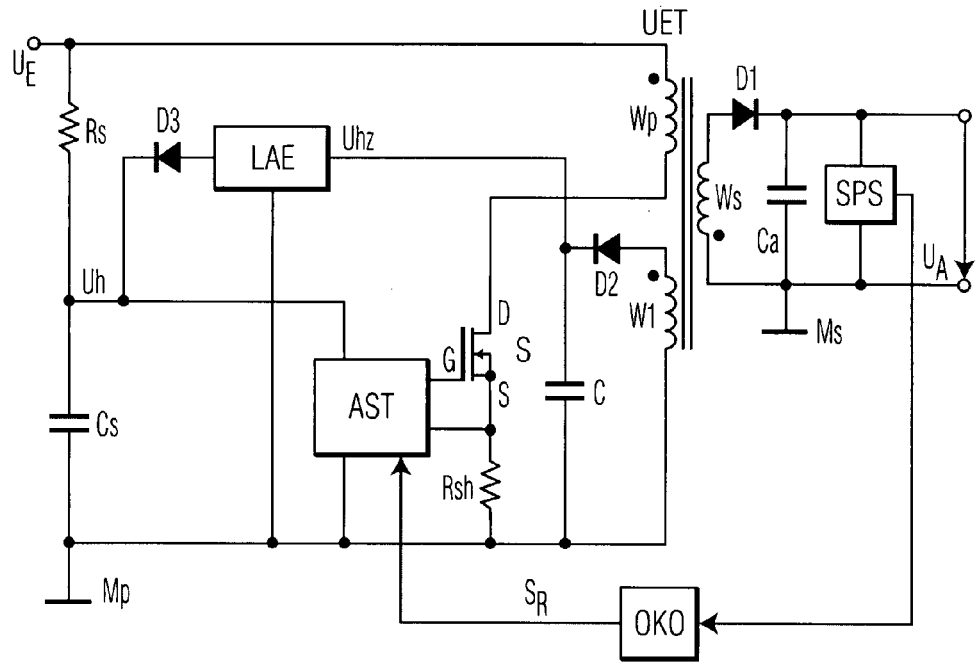
FIG. 1 shows the circuit diagram of a switching converter according to the state of the art.
Figure 2:
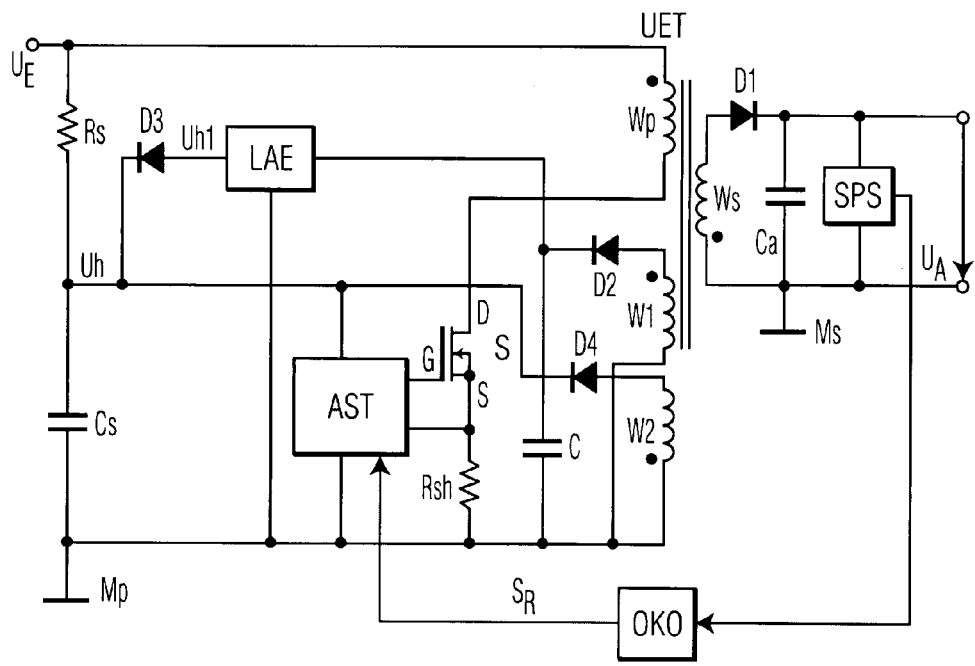
FIG. 2 shows a first embodiment of a switching converter according to the present invention with an additional auxiliary winding.

The embodiment according to the present invention, as is shown in FIG. 2, differs from the circuit according to the state of the art, which is shown in FIG. 1, in that an additional auxiliary winding W2, whose off-state voltage is used, is provided at the transformer, which is indicated by a point offset in relation to the windings WP and W1. The off-state voltage is recified by means of a diode D4 and lies on the storage capacitor Cs.

The present invention makes use of the fact that an off-state (auxiliary) voltage is automatically also regulated in a combinational switching circuit that operates according to the principle of the flyback converter, because the transformer windings are coupled with one another. The winding W2 is dimensioned now such that the desired supply voltage Uh of the control circuit AST is greater during operation at normal rating than the output voltage Uh1 of the series regulator LAE, e.g., by about 1 V to 2 V. The voltage outputs Uh and Uh1 are connected with one another via the uncoupling diode D3, and the control circuit AST is supplied from the winding W2 as long as the voltage Uh is greater than the voltage Uh1. This means that no current is flowing through the series regulator LAE and therefore no power loss occurs in it, either.

If the output voltage $U_A$ decreases in special operating states, e.g., in case of overload or short-circuit, the off-state voltage also decreases correspondingly on the secondary winding WS, and the rectified voltage becomes smaller than Uh1. The voltage Uh1 replaces the voltage Uh in this case and the series regulator LAE becomes active. Therefore, power loss develops on the series regulator LAE in rare cases of operation only, de facto in case of short-circuit at the output. The function is otherwise the same, for example, as far as the start-up of the circuit by means of the resistor Rs and the storage capacitor Cs is concerned, as according to the state of the art.

Figure 3:
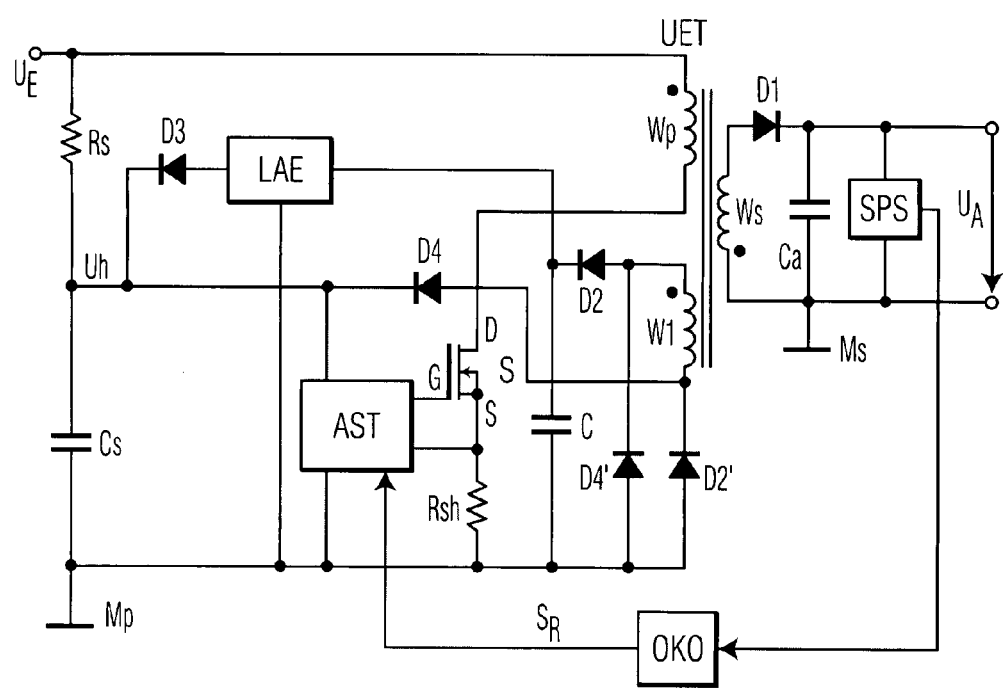
FIG. 3 shows another embodiment of the present invention with a single auxiliary winding.

The circuit according to the present invention, as is shown in FIG. 3, shows that a single auxiliary winding W1 may possibly also be sufficient. It must only be ensured that both the forward voltage and the off-state voltage, which is proportional to the output voltage $U_A$, can be taken from the auxiliary winding W1 in a suitable and uncoupled manner. Based on the circuit according to the state of the art, as it is shown in FIG. 1, this can be achieved by introducing an uncoupling diode D2', a rectifier diode D4 and another uncoupling diode D4'. As in the embodiment according to FIG. 2, the off-state voltage on the auxiliary winding W1, which is rectified by means of the diodes D4 and D4' and lies on the storage capacitor Cs, is used in the normal case of operation. This rectified off-state voltage drops and the forward voltage on the winding W1, which is rectified by means of the diodes D2 and D2', is used via the series regulator LAE only when the regulated output voltage $U_A$ actually drops, e.g., in case of a short-circuit. The diodes D2' and D4' are also necessary for the mutual uncoupling of the two voltages.

It should be noted that the embodiment of the present invention according to the circuit shown in FIG. 3 has the advantage that it needs only a single auxiliary winding W1, but this embodiment is more critical concerning its dimensioning than the circuit according to FIG. 2 because it is not possible to determine the off-state voltage and the forward voltage independently from one another, by selecting the turns ratio of W1 and W2.

Although the invention is illustrated and described herein with reference to a specific embodiment, the invention is not intended to be limited to the details shown. Rather, various modifications may be made in the details within the scope and range of equivalents of the claims and without departing from the invention.

We claim:

1. A switching converter, for use with an input voltage comprising:
   at least one control switch coupled to at least one primary winding of a transformer, with
   a control circuit for controlling the switch, to which a regulating signal in the sense of the regulation of at least an output voltage is sent, wherein the power supply of the control circuit is provided via:
   i) a forward voltage of an auxiliary winding of the transformer, a first rectifier, a capacitor and aseries regulator, or
   ii) the input voltage, via a current path and a storage capacitor during initialization of the voltage converter,
   wherein an off-state voltage of the auxiliary winding, which is rectified by means of a second rectifer is provided to the control circuit as an alternative power supply, wherin the rectified off-state voltage of the auxiliary winding is used to supply power to the control circuit during operation as long as the auxiliary winding has at least a predetermined voltage level.

2. The switching converter in accordance with claim 1, wherein a second auxiliary winding of the transformer is provided to generate the off-state voltage, the offstate voltage being used via the second rectifier directly to supply power to the control circuit.

3. The switching converter in accordance with claim 1, wherein the forward voltage as well as the off-state voltage are taken from the auxiliary winding, wherein first uncoupling/rectifier diodes rectify the forward voltage and lead to a series regulator, and additional uncoupling/rectifier diodes rectify the off-state voltage and lead to the supply voltage terminal of the control circuit.

4. Switching converter in accordance with claim 1, wherein the output of the series regulator is connected with the storage capacitor via an uncoupling diode.

5. The switching converter in accordance with claim 2, wherein the output of the series regulator is connected with the storage capacitor via an uncoupling diode.

6. The switching converter in accordance with claim 3, wherein the output of the series regulator is connected with the storage capacitor via an uncoupling diode.

7. The switching converter in accordance with claim 1, wherein the power is provided to the control circuit from the auxiliary winding via the second rectifier when the rectified output voltage of the auxiliary winding exceeds an output of the series regulator by about at least 1 volt during operation of the switching converter.

8. A switching converter to convert an input voltage into an output voltage, the converter comprising:
   a transformer having at least a primary winding, a secondary winding and an auxiliary winding;
   at least one control switch coupled to the primary winding;
   a controller coupled to the control switch and adapted to provide a control signal to the switch, the controller receiving a regulating signal based on an output voltage of the secondary winding; and
   a power source for the controller provided from either i) the input voltage during startup of the converter, or ii) a forward voltage of an auxiliary winding of the transformer during operation of the converter, wherein an off-state voltage of the auxiliary winding is also provided to the control circuit as an alternative power source, the rectified off-state voltage of the auxiliary winding providing power to the control circuit during operation as long as the auxiliary winding has at least a predetermined voltage level.

9. The switching converter in accordance with claim 8, further comprising a voltage regulator coupled between the auxiliary winding and the controller, wherein power is provided to the controller by the off-state voltage of the auxiliary winding rather than from the voltage regulator when the output of the auxiliary winging exceeds the output of the voltage regulator.

* * * * *